(12) United States Patent
Kurth

(10) Patent No.: US 8,052,151 B2
(45) Date of Patent: Nov. 8, 2011

(54) SEALING ARRANGEMENT

(75) Inventor: Jürgen Kurth, Odenthal (DE)

(73) Assignee: AB SKF, Gothenburg (SE)

( * ) Notice: Subject to any disclaimer, the term of this patent is extended or adjusted under 35 U.S.C. 154(b) by 264 days.

(21) Appl. No.: 11/512,121

(22) Filed: Aug. 30, 2006

(65) Prior Publication Data

US 2007/0063452 A1   Mar. 22, 2007

(30) Foreign Application Priority Data

Aug. 31, 2005  (DE) .......................... 10 2005 041 553

(51) Int. Cl.
*F16J 15/32* (2006.01)
*B01D 29/00* (2006.01)
*G01F 1/42* (2006.01)

(52) U.S. Cl. ........ 277/551; 277/572; 277/627; 277/650; 277/918; 210/459; 210/460; 138/44

(58) Field of Classification Search ................. 277/918, 277/551, 572, 627, 607, 650; 138/44; 210/459, 210/460
See application file for complete search history.

(56) References Cited

U.S. PATENT DOCUMENTS

| | | | | | |
|---|---|---|---|---|---|
| 2,100,165 | A | * | 11/1937 | Holmberg et al. | 239/560 |
| 2,103,425 | A | * | 12/1937 | Lehman | 210/449 |
| 2,314,357 | A | * | 3/1943 | Lehman | 210/449 |
| 2,664,278 | A | * | 12/1953 | Aghnides | 239/428.5 |
| 3,206,216 | A | * | 9/1965 | Crook | 277/637 |
| 4,493,490 | A | * | 1/1985 | Ohma | 280/276 |
| 4,824,565 | A | * | 4/1989 | Middleton | 210/266 |
| 4,943,068 | A | * | 7/1990 | Hatch et al. | 277/353 |
| 5,456,475 | A | | 10/1995 | Abraham et al. | |
| 5,494,222 | A | * | 2/1996 | Chiu | 239/462 |
| 5,509,666 | A | * | 4/1996 | Abraham et al. | 277/562 |
| 5,533,737 | A | * | 7/1996 | Borowski | 277/419 |
| 5,861,122 | A | * | 1/1999 | Ashraf-Khorassani et al. | 422/69 |
| 6,547,255 | B1 | * | 4/2003 | Donaway et al. | 277/602 |
| 7,832,735 | B2 | * | 11/2010 | Paykin | 277/568 |

FOREIGN PATENT DOCUMENTS

| | | |
|---|---|---|
| EP | 1 091 156 A2 | 4/2001 |
| GB | 1 453 122 | 10/1976 |
| GB | 2 217 625 A | 11/1989 |
| JP | 63-171648 | 11/1988 |
| JP | 01-316566 | 12/1989 |
| JP | 2000-002340 | 1/2000 |

OTHER PUBLICATIONS

*European Search Report dated Jul. 7, 2007.
English translation of Japanese Office Action dated Aug. 18, 2009.

* cited by examiner

*Primary Examiner* — Alison Pickard
(74) *Attorney, Agent, or Firm* — Buchanan Ingersoll & Rooney PC

(57) ABSTRACT

In a sealing arrangement sealing at least one axial end section of a hollow shaft that is arranged in a cavity of a component, with the hollow shaft being adapted to route a fluid, a gasket is adapted to be located between the component and the shaft. The gasket is made with a sealing lip to adjoin the outer peripheral surface of the end section. The gasket also includes an axially projecting portion that projects axially beyond the end of the shaft. The axially projecting portion of the gasket surrounds a device for filtering the fluid and/or a device for determining the flow cross-section of the fluid.

20 Claims, 1 Drawing Sheet

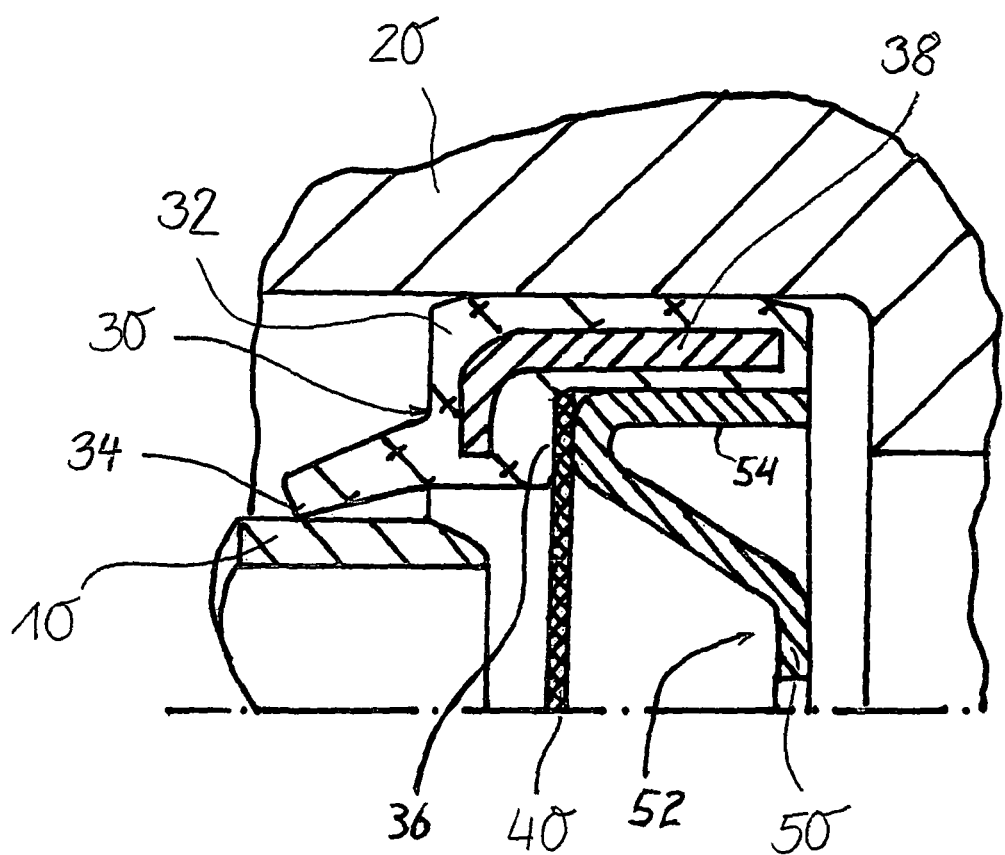

SEALING ARRANGEMENT

FIELD OF THE INVENTION

The invention generally relates to a sealing arrangement. More particularly, the invention pertains to a sealing arrangement that seals at least one axial end section of a hollow shaft arranged in a cavity of a component with a gasket located between the component and the shaft.

BACKGROUND DISCUSSION

It is known to insert seals at a transition site of a pipe that is designed to turn for routing a fluid in a fluid conveyance device that is not designed to turn. Furthermore, inserting filters as well as restrictors that limit the flow cross-section of the fluid in the line path for guiding a fluid is also known.

SUMMARY

A need exists for a way of sealing at least one axial end section of a hollow shaft that is designed to turn and to route a fluid in a cavity of another component so that the seal arrangement designed for this purpose, together with other mechanisms for influencing the properties of the fluid flow, can be made relatively compact and can be mounted in a relatively simple way.

On aspect of the disclosure involves the combination of a hollow shaft designed to route a fluid, a component possessing a cavity in which an end of the shaft is arranged, and a sealing arrangement, wherein the sealing arrangement comprises a gasket located between an end section at one end of the shaft and the component. The gasket comprises a sealing lip acting against an outer peripheral surface of the end section of the shaft, with an axially projecting portion of the gasket projecting axially beyond the end of the shaft. A mesh screen which filters the fluid and a restrictor which determines a flow cross-section of the fluid are surrounded by the axially projecting portion of the gasket.

According to another aspect, a sealing arrangement is adapted to seal at least one axial end section of a hollow shaft that is arranged in a cavity of a component, with the hollow shaft being adapted to route a fluid. The sealing arrangement comprises a gasket adapted to be located between the component and the shaft, wherein the gasket comprises a sealing lip configured to rest against an outside surface of the end section of the shaft. The gasket comprises an axially projecting portion adapted to project axially beyond the end of the shaft, and wherein at least one of means for filtering the fluid and means for determining a flow cross-section of the fluid is surrounded by the axially projecting portion of the gasket.

Compared to, for instance , an arrangement where the gasket, the fluid filtering means and the means for determining the flow cross-section of the fluid are kept in position axially behind one another, for example separated by spacers, installation of the sealing arrangement here is simplified in that essentially only the gasket need be mounted accordingly. The means for filtering the fluid and means for determining the flow cross-section are integrated with the gasket and so the means for filtering the fluid and the means for determining the flow cross-section are also mounted together with the gasket. In addition to the simplification of this mounting, a relatively compact arrangement of this functional group is advantageously achieved.

BRIEF DESCRIPTION OF THE DRAWING FIGURE

Other aspects, features and details associated with the sealing arrangement will become more apparent from the following detailed description of one exemplary embodiment considered with reference to the accompanying drawing FIGURE which is a longitudinal cross-sectional view of the upper half of a sealing arrangement disclosed herein.

DETAILED DESCRIPTION

The illustration in the drawing FIGURE shows, in longitudinal cross-section, the upper half of a sealing arrangement sealing the axial end section of a hollow shaft 10 that is designed to turn and route a fluid. The end of the hollow shaft is arranged in a cavity of another component 20. According to one example, the other component 20 is a housing of a machine component.

The sealing arrangement includes a gasket 30 arranged between the end section of the hollow shaft 10 and the other component 20. In this case, the gasket 30 comprises an elastomer part 32 and a stiffening part 38. Here, the elastomer part 32 is made of a polymer material and forms a sealing lip 34 that is radially peripherally sealed against the outer peripheral surface of the end section of the hollow shaft 10. The sealing lip 34 ensures dynamic sealing between the hollow shaft 10 that is designed to turn and the other component 20 that is not designed to turn.

The gasket 30 is furthermore made such that it projects axially over or axially beyond the end of the hollow shaft 10. The elastomer part 32 in this area is made to form a cylindrical outer surface via which the gasket 30 is attached in the other component 20 and is thus arranged to seal statically. The stiffening part 38 is surrounded completely by the elastomer part 32. The stiffening part 38 is made of, for example, a metal, a plastic or the like. As illustrated, the stiffening part 38 includes an axially extending portion and a radially extending portion. Thus, the stiffening part 38 possesses a hollow cylindrical shape, with the hollow cylinder on the axial end closest to the sealing lip 34 extending radially inward toward the inside in the manner of a ring. This ensures that the seating of the gasket 30 in the other component 20 is continuous and reliably prevents flow of a refrigerant between the indicated outside surface of the gasket 30 and the opposing inside surface of the cavity of the other component 20. In the illustrated example, at least the axially extending portion of the stiffening part 38 is arranged in this axially projecting area of the gasket 30.

The portion of the elastomer part 32 projecting axially beyond the end of the hollow shaft 10 has a cylindrical inside surface that surrounds a filter 40 (filter means) 40 for filtering the refrigerant and also a flow restrictor 50 forming a flow cross-section determining means for determining the flow cross-section of the fluid. In the illustrated example, the filter 40 is in the form of a disk-shaped, fine-mesh screen. In the illustrated example, the restrictor 50 is an annular restrictor whose central area forms a trough shape 52 in longitudinal cross-section, with the bottom of the trough being formed as a perforated disk. At the outer edge portion 54, the restrictor 50 continues axially in the shape of a hollow cylinder so that the axially extending edge portion coincides with the axial extent of the trough-shaped central area 52. Thus, the hollow cylindrical area 54 of the restrictor 50 is located in the gasket 30 in a manner forming an interference fit. In this way, the screen 40 is also reliably held in the gasket 30 at the same time. That is, the screen 40 is held between a shoulder 36 of the gasket 30 and a portion of the flow restrictor 50 as shown in the drawing FIGURE.

The trough-like configuration of the restrictor 50 also advantageously provides for the perforated disk area of the restrictor to be located at a definable distance relative to the fine-mesh screen as an element that actually determines the flow cross-section. Here, the fine-mesh screen with a sufficiently large free flow cross-section prevents the opening of the restrictor from being narrowed or even closed by, for example, foreign particles. By way of example, the restrictor is produced from metal, especially a sheet, by suitable forming, especially noncutting forming, or else from a plastic material.

Because the restrictor and the fine mesh screen are integrated into the gasket 30, a functional module is formed. The mounting of this functional module, which produces the functions of throttling, filtering and static and dynamic sealing at the same time, is accordingly relatively easy, quick and uncomplicated, since only the functional module as a whole need be arranged between the hollow shaft 10 and the other component 20.

The principles, preferred embodiment and other disclosed aspects have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. The combination of a rotatable hollow shaft designed to route flow-through of a fluid and having an end section, a sealing arrangement, and a non-rotatable component having a cavity for further routing the flow-through of the fluid beyond the sealing arrangement, the end section of the shaft being arranged in the cavity, the sealing arrangement comprising a gasket located between an end section at the end of the shaft and the component, the gasket comprising a sealing lip acting against an outer peripheral surface of the end section of the shaft to dynamically seal between the rotatable shaft and the gasket, the gasket comprising an outer surface which statically seals between the gasket and an inner surface of the cavity of the non-rotatable component, an axially projecting portion of the gasket projecting axially beyond the end of the shaft, a mesh screen extending completely across an inner bore of the gasket which filters the flow-through of the fluid and a restrictor which determines a flow cross-section of the flow-through of the fluid, the mesh screen and the restrictor being disposed within the inner bore of the gasket and surrounded by the axially projecting portion of the gasket, the shaft being rotatable within the gasket, the restrictor and the mesh screen being located at different axial positions relative to one another, wherein the mesh screen is disposed axially between, and engages, the restrictor and a radially inwardly projecting portion of the gasket to be retained within the gasket.

2. The combination according to claim 1, wherein the gasket comprises an elastomer part made of a polymer material.

3. The combination according to claim 2, wherein the gasket comprises a stiffening part completely surrounded by the elastomer part.

4. The combination according to claim 3, wherein the stiffening part comprises an axially extending portion and a radially extending portion at one axial end of the axially extending portion of the stiffening part, the axially extending portion of the stiffening part being located within the axially projecting portion of the gasket.

5. The combination according to claim 1, wherein the mesh screen is a disk-shaped mesh screen.

6. The combination according to claim 1, wherein the restrictor is an annular shaped restrictor comprising a perforated disk-shaped area.

7. The combination according to claim 1, wherein the restrictor comprises a central area that is trough-shaped in longitudinal cross-section and a hollow cylindrical outer edge area that extends axially.

8. A sealing arrangement adapted to seal at least one axial end section of a rotatable separate hollow shaft that is arranged in a cavity of a non-rotatable component, the sealing arrangement comprising:
a gasket forming an axiallly extending fluid passage therethrough and including:
a sealing lip having a radially inner end,
a radially projecting surface facing axially away from the sealing lip, and
an axially projecting portion, the axially projecting portion including a radially outwardly facing cylindrical outer surface, and a radially inwardly facing cylindrical inner surface extending axially from a radially outer edge of the radially projecting surface in a direction away from the sealing lip, the cylindrical inner surface forming an inner bore of the gasket,
a filter within the inner bore of the gasket for filtering fluid and having an axial thickness shorter than the diameter of the cylindrical inner surface; and
a dimension-changing member arranged within the inner bore for changing a cross-sectional dimension of fluid flowing through the gasket, the dimension-changing member including a radially outer portion and an integral radially inner portion extending inwardly from the outer portion, the radially outer portion forming a first opening adjacent one axial end of the dimension-changing member, the radially inner portion forming a second opening adjacent an opposite axial end of the dimension-changing member which is smaller cross-sectional size than the first opening,
wherein the filter engages both the radially projecting surface of the gasket and the dimension-changing member and is disposed axially therebetween, to be retained axially within the inner bore.

9. The sealing arrangement according to claim 8, wherein the gasket comprises an elastomer part made of a polymer material.

10. The sealing arrangement according to claim 9, wherein both the filter and the dimension-changing member are surrounded by the axially projecting portion of the gasket, the dimension-changing member being annular in shape.

11. The sealing arrangement according to claim 10, wherein the dimension-changing member comprises a perforated disk-shaped area.

12. The sealing arrangement according to claim 10 wherein the dimension-changing member comprises a central area that is trough-shaped in longitudinal cross-section and a hollow cylindrical outer edge area that extends axially.

13. The sealing arrangement according to claim 8, wherein the gasket comprises a stiffening part.

14. The sealing arrangement according to claim 13, wherein the stiffening part is completely surrounded by the elastomer part.

15. The sealing arrangement according to claim 13, wherein the stiffening part comprises an axially extending portion located within the axially projecting portion of the gasket.

16. The sealing arrangement according to claim 13, wherein the stiffening part is a hollow cylinder.

17. The sealing arrangement according to claim 16, wherein the stiffening part comprises, on an axial end of the hollow cylinder facing the sealing lip, a radially inwardly extending portion.

18. The sealing arrangement according to claim 13, wherein the stiffening part is made from one of a metal material and a plastic material.

19. The sealing arrangement according to claim 8, wherein both the filter and the dimension-changing member are surrounded by the axially projecting portion of the gasket, the filter being disk-shaped.

20. The sealing arrangement according to claim 8, wherein the filter is a mesh screen.

* * * * *